US012584621B2

(12) United States Patent
Rutherford et al.

(10) Patent No.: US 12,584,621 B2
(45) Date of Patent: Mar. 24, 2026

(54) CONNECTOR FOR INTEGRATED LIGHTING AND POWER FOR CABINETRY

(71) Applicant: Sensio America, LLC, Carol Stream, IL (US)

(72) Inventors: Gary B. Rutherford, Wheaton, IL (US); Paul Bardwell, Rexford, NY (US); Jeffery A. Conrady, Aurora, IL (US)

(73) Assignee: SENSIO AMERICA, LLC, Carol Stream, IL (US)

( * ) Notice: Subject to any disclaimer, the term of this patent is extended or adjusted under 35 U.S.C. 154(b) by 285 days.

(21) Appl. No.: 18/241,800

(22) Filed: Sep. 1, 2023

(65) Prior Publication Data

US 2023/0408078 A1 Dec. 21, 2023

Related U.S. Application Data

(63) Continuation of application No. 17/625,718, filed as application No. PCT/US2020/041434 on Jul. 9, 2020, now Pat. No. 11,747,005.

(Continued)

(51) Int. Cl.
*F21V 23/06* (2006.01)
*F21S 2/00* (2016.01)

(Continued)

(52) U.S. Cl.
CPC .............. *F21V 23/06* (2013.01); *F21S 2/005* (2013.01); *F21S 4/28* (2016.01); *F21V 23/008* (2013.01);

(Continued)

(58) Field of Classification Search
USPC .......................................................... 439/639
See application file for complete search history.

(56) References Cited

U.S. PATENT DOCUMENTS 5,748,424 A * 5/1998 Hung .................... H02H 9/042 361/111
5,903,993 A 5/1999 Maticko et al.

(Continued)

FOREIGN PATENT DOCUMENTS

CN 202302954 U 7/2012
CN 204678170 U 9/2015
WO 2021007449 A1 1/2021

OTHER PUBLICATIONS

International Preliminary Report on Patentability cited in corresponding international patent application No. PCT/US2022/051741; May 2, 2024; 7 pp.

(Continued)

*Primary Examiner* — Tho D Ta
(74) *Attorney, Agent, or Firm* — Lempia Summerfield Katz LLC

(57) ABSTRACT

A connector for an integrated lighting and power system for cabinets includes: a body; a first port having a depth into the body, N number of electrical contacts therein, and an opening at a surface of the body; a second port having a depth into the body, N number of electrical contacts therein, and an opening at a surface of the body; and a third port having a depth into the body, N number of electrical contacts therein, and an opening at a surface of the body. Each port of the first, second, and third ports is oriented facing a different direction relative to the other of the first, second, and third ports.

5 Claims, 9 Drawing Sheets

Related U.S. Application Data

(60) Provisional application No. 62/872,236, filed on Jul. 9, 2019.

(51) Int. Cl.

| | |
|---|---|
| ***F21S 4/28*** | (2016.01) |
| ***F21V 23/00*** | (2015.01) |
| *F21W 131/301* | (2006.01) |
| *F21Y 103/10* | (2016.01) |
| *F21Y 115/10* | (2016.01) |

(52) U.S. Cl.

CPC .... *F21W 2131/301* (2013.01); *F21Y 2103/10* (2016.08); *F21Y 2115/10* (2016.08)

(56) References Cited

U.S. PATENT DOCUMENTS

| | | | | |
|---|---|---|---|---|
| 8,469,730 | B2 * | 6/2013 | Garb | H01R 31/065 439/166 |
| 9,019,721 | B2 * | 4/2015 | Chen | G06F 1/1656 439/23 |
| 9,374,856 | B2 | 6/2016 | Winton | |
| 10,389,059 | B1 * | 8/2019 | Li | H01R 31/065 |
| 10,851,988 | B2 | 12/2020 | Rutherford | |
| 11,747,005 | B2 | 9/2023 | Rutherford | |
| 2008/0112161 | A1 | 5/2008 | Summers et al. | |
| 2008/0151535 | A1 | 6/2008 | De | |
| 2009/0073693 | A1 | 3/2009 | Nall | |
| 2010/0008090 | A1 | 1/2010 | Li et al. | |
| 2011/0285314 | A1 | 11/2011 | Carney | |
| 2013/0016500 | A1 | 1/2013 | Tress | |
| 2014/0065886 | A1 * | 3/2014 | Lee | H01R 27/02 439/628 |
| 2014/0334142 | A1 | 11/2014 | Levante et al. | |
| 2014/0362574 | A1 | 12/2014 | Barrett | |
| 2015/0207271 | A1 * | 7/2015 | Si | H01R 31/02 439/628 |
| 2015/0241035 | A1 | 8/2015 | Dankelmann et al. | |
| 2018/0283668 | A1 | 10/2018 | Conrady et al. | |
| 2018/0306422 | A1 | 10/2018 | Carney et al. | |
| 2019/0154241 | A1 | 5/2019 | Danville et al. | |
| 2020/0248880 | A1 | 8/2020 | Hamer | |
| 2021/0088208 | A1 | 3/2021 | Hou et al. | |
| 2023/0408078 | A1 | 12/2023 | Rutherford | |

OTHER PUBLICATIONS

International Preliminary Report on Patentability cited in the international PCT app No. PCT/US2020/041434; Jan. 11, 2022; 11 pp.

International Search Report and Written Opinion cited in corresponding international patent application No. PCT/US2022/051741; May 9, 2023; 11pp.

Office Action cited in Canadian patent application No. 3,146,578; Mar. 27, 2024; 4 pp.

Office Action cited in Chinese patent application No. 202080063185.4; Mar. 13, 2024; 39 pp.

International Search Report and Written Opinion cited in corresponding PCT app No. PCT/US2020/041434; Nov. 23, 2020; 15 pp.

* cited by examiner

CONNECTOR FOR INTEGRATED LIGHTING AND POWER FOR CABINETRY

RELATED APPLICATION DATA

The present application is a continuation of U.S. application Ser. No. 17/625,718 filed Jan. 7, 2022, which claims priority to International Application No. PCT/US2020/041434 filed Jul. 9, 2020 and titled "Integrated Lighting and Power for Cabinetry", and which claims priority to U.S. Provisional Application Ser. No. 62/872,236 filed Jul. 9, 2019 and having the same title. The entire contents of these prior filed applications are hereby incorporated by reference herein.

BACKGROUND

1. Field of the Disclosure

This disclosure is generally related to power delivery and lighting for storage cabinets, and more particularly to an integrated power and lighting system and solution for cabinetry.

2. Description of Related Art

It is becoming common to incorporate lighting and lighting features into storage cabinets and cabinet systems when such cabinet systems are installed. For example, new kitchen designs often incorporate multiple zone cabinet lighting solutions among the cabinetry. Such cabinet systems can include wall cabinets with an under-cabinet zoned lighting. This type of lighting can be provided for utility to illuminate the countertop and appliance work surfaces beneath the wall cabinets. Such cabinet systems can also include interior cabinet and drawer lighting. Interior lighting can provide utility to illuminate drawers and solid door cabinets when opened. This type of lighting can aid users in seeing the contents of such spaces. Zoned lighting can also be provided for aesthetics to illuminate wall and other cabinets with glass panels in the cabinet doors. This type of lighting can be employed to more softly illuminate the cabinet interiors and to highlight visible objects stored within such glass front cabinets. Such cabinet systems can also include upper soffit zoned lighting for illuminating areas above the tops of the wall cabinets. This type of lighting can be provided for soft or adjustable general illumination for a space that contains the cabinets.

The components of these lighting features are typically installed on site, once the cabinets are delivered, and during and/or after the cabinets are installed at the site. No matter the cabinet system or installation, the method of installing such lighting features or solutions is tedious, time consuming, and often complicated. This generally requires physical modification of the cabinets, such as drilling holes and the like. Further, the wiring that is required to accommodate cabinet lighting features typically includes a separate power connection to a power source for each different zone of the lighting arrangement. Power for each lighting zone must be connected both to the dedicated site power source and to the illumination elements or lights of each zone, such as the different lighting strips. A separate power cord is thus typically run from the lights in each zone to the power source. Light emitting diode (LED) lights, and particularly LED lighting strips, are commonly used for lighting features and solutions for cabinet systems. Each zone or application noted above might require a different type of light source (bright task light, soft accent light, warm white or cool white light, colored light, etc.) to provide the specific desired light characteristics of a particular zone or application.

It is common to arrange a lighting system such that each zone is separately controlled for independent dimming and/or independent ON/OFF control. To achieve this, power is connected to the lighting features by plugging in or hard wiring a separate power adapter for each zone to the on-site power source, such as a 120V AC system. Each power adapter is then connected to the corresponding lighting feature or lights for that specific zone. In some cases, one or more of the zoned lighting features are intended to be a switched system and may be capable of being switched independent of any other zone. A switched wall socket may be provided at the site and each respective power adapter may be plugged into a switched socket. In other cases, one or more wall switches to operate the lights may be installed on site. The wall switches are then hard wired to the electrical power source at the site and hard wired either to the respective power adapter for the lights or directly to the wiring for the lights for each switched zone. The different types of lighting features or zones noted above are each connected to a separate electrical power source, switch, or the like for independent control of each type of lighting. This can further complicate the on-site installation of the lighting systems and can drive up cost.

During a conventional installation of an illuminated cabinet system, the installer must prepare the lights for each cabinet, which may include cutting each LED strip to the appropriate length. The installer must also attach or install each light strip or element in the desired location for each cabinet, whether on top, within, or under each cabinet. The installer must also drill holes in the cabinets where wiring will run between adjacent cabinets to connect lights of one particular feature on each cabinet to one another. The installer must also cut, trim, and run or route all of the wiring for each light strip or feature and then must connect all the wiring to the power source and to the appropriate light strips or features. If the installer has two or three types or zones of lighting features, such as the under cabinet, interior cabinet, or above cabinet lighting, to install on multiple cabinets, the installer must measure for and drill holes for each feature, install the lights for each feature, prepare, run, and connect all of the wiring for each feature, and separately connect the power to each feature.

SUMMARY

In one example, according to the teachings of the present disclosure, a cabinet system with integrated lighting and power includes a cabinet defining a first illumination zone, a first connector having at least a first port and a second port, and a first light strip. The first light strip has an elongate substrate with a first end, a second end, a plurality of illumination elements spaced apart along the substrate, and multiple traces extending lengthwise along the substrate. The multiple traces include a voltage trace, a first trace connected to the plurality of illumination elements, and a second trace not connected to the plurality of illumination elements. The first end is received in the first port of the first connector. The cabinet system also has a driver coupled to a power source. The driver has a lead connected to the second port on the first connector. The illumination elements of the first light strip are selectively controlled by controlling power to the voltage trace and the first trace to illuminate the illumination zone.

In one example, the elongate substrate of the first light strip can be a printed circuit board (PCB) substrate that is substantially rigid.

In one example, the one or more strips can include a power pass strip having an elongate substrate with a first end, a second end, and multiple traces extending lengthwise along the substrate. The multiple traces can include a voltage trace, a first trace, and a second trace. The power pass strip can be configured to pass power along the length of the power pass strip.

In one example, the cabinet system can include a plurality of the connectors.

In one example, the cabinet system can include a plurality of the connectors and each connector can include at least a first port, a second port, and a third port.

In one example, the cabinet system can include a plurality of the connectors, which can include at least two connector types. One connector type can be a first type of corner connector for selective upper/top left side use and lower/bottom right side use on a cabinet. The other connector type can be a second type of corner connector for selective upper/top right side use and lower/bottom left side use on a cabinet.

In one example, the two connector types can be mirror images of one another.

In one example, the connector can also include a third port similar to the first port and configured to receiving a first or second end of one of the one or more strips.

In one example, the connector can include a third port and each of the first, second, and third ports can be oriented facing a different direction relative to the other of the first, second, and third ports.

In one example, the connector can include a third port and each of the first, second, and third ports can be oriented in a different direction relative to a different axis and about 90 degrees relative to the other of the first, second, and third ports.

In one example, the cabinet system can include a second illumination zone, a second connector having a first port and a second port, and the one or more strips can include a second light strip. The second light strip can have an elongate substrate with a first end, a second end, a plurality of illumination elements spaced apart along the substrate, and multiple traces extending lengthwise along the substrate. The multiple traces can include a voltage trace, a first trace not connected to the plurality of illumination elements, and a second trace connected to the plurality of illumination elements. The first end can be received in the first port of the second connector and the illumination elements of the second light strip can be selectively controlled by controlling power to the voltage trace and the second trace to illuminate the second illumination zone.

In one example, power from the power source can be distributed from the first connector along the first light strip to a second connector and to a second light strip.

In one example according to the teachings of the present disclosure, a connector for a cabinet system includes: a body; a first port having a depth into the body, N number of electrical contacts therein, and an opening at a surface of the body; a second port having a depth into the body, N number of electrical contacts therein, and an opening at a surface of the body; and a third port having a depth into the body, N number of electrical contacts therein, and an opening at a surface of the body. Each of the first, second, and third ports is oriented facing a different direction relative to the other of the first, second, and third ports. The N number of electrical contacts is disposed at or very near the opening for each of the first, second, and third ports.

In one example, each of the first, second, and third ports can be oriented relative to a different axis of the body and about 90 degrees relative to the other of the first, second, and third ports.

In one example, the connector can include a second connector that can be a substantial mirror image of the connector.

In one example, an integrated lighting and power system for cabinetry can include a driver configured to connect to a power source and having a lead and a male connector at a free end of the lead, a controller in communication with the driver, one or more first light strips; and one or more second light strips. Each of the first light strips has an elongate substrate with a first end, a second end, a plurality of illumination elements spaced apart along the substrate, and multiple traces extending lengthwise along the substrate. The multiple traces include a voltage trace, a first trace connected to the plurality of illumination elements, and a second trace not connected to the plurality of illumination elements. Each of the second light strips has an elongate substrate with a first end, a second end, a plurality of illumination elements spaced apart along the substrate, and multiple traces extending lengthwise along the substrate. The multiple traces include a voltage trace, a first trace not connected to the plurality of illumination elements, and a second trace connected to the plurality of illumination elements. The system also has a plurality of connectors configured to mount to cabinetry. Each of the connectors has a body and at least a first port and a second port. The first port of each of the plurality of connectors is configured to receive therein the first end or the second end of any light strip of the one or more first and second light strips. The second port of any one of the plurality of connectors is configured to receive therein the male connector of the driver. The controller is configured to independently control illumination of any of the first and second lights strips connected to any of the plurality of connectors by controlling power to the voltage trace and selectively to the corresponding first and second traces and thus to the respective illumination elements.

In one example, the system can include one or more jumpers with a male connector at each end. The one or more jumpers can be configured to connect to the first or third port of any of the one or more connectors.

In one example, the system can include one or more power pass strips. Each power pass strip can have an elongate substrate with a first end, a second end, and multiple traces extending lengthwise along the substrate. The multiple traces can include a voltage trace, a first trace, and a second trace. The power pass strip can be configured to pass power along the length of the power pass strip between any two of the plurality of connectors.

In one example according to the teachings of the present disclosure, a method of controlling multiple different illumination zones of a cabinet installation includes utilizing the cabinet system, the connectors, and the integrated lighting and power system of any one or more of the aforementioned examples, and/or any one or more of the fabrication, installation, and/or operation and control steps as disclosed and described herein.

BRIEF DESCRIPTION OF THE DRAWINGS

The drawings provided herewith illustrate one or more examples or embodiments of the disclosure and therefore should not be considered as limiting the scope of the disclosure. There may be other examples and embodiments that may be equally effective to achieve the objectives and that may fall within the scope of the disclosure. Objects, features, and advantages of the present disclosure will become apparent upon reading the following description in conjunction with the drawing figures, in which.

DETAILED DESCRIPTION OF THE DISCLOSURE

Figure 1:
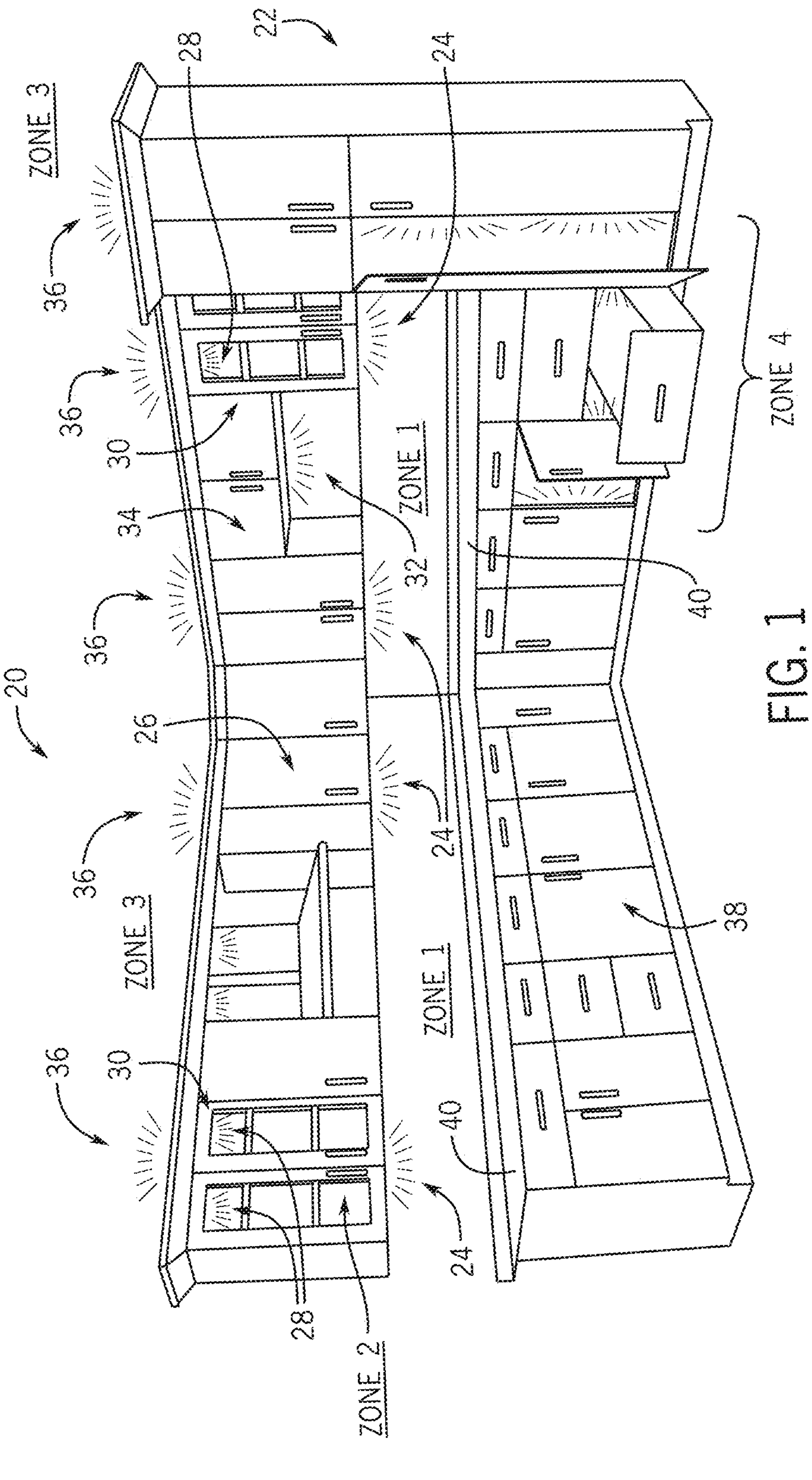
FIG. 1 shows a view of a generic cabinet arrangement and installation.

As used herein, the term "zone" or "zoned lighting" generally refers to a group of lights that are powered simultaneously by the same power channel of a lighting system. In most instances, that meaning also applies to a group of lights that are controlled (ON, OFF, DIM) together as a single unit. Exceptions are noted herein with regard to interior illumination within a solid door or solid panel cabinet and within a drawer. In this example, the lights for these types of "zones" are or may be powered by the same power channel of the lighting system. However, separate controls or an added layer of control, such as an OPEN/CLOSE or ON/OFF switch, may be applied to each solid door cabinet and/or each drawer. For these "zones", the lights for each cabinet and drawer may remain powered, but OFF, and may be turned ON independently of one another as a particular drawer or cabinet door is opened. Thus, it is understood herein that there may be a distinction for these types of "zones" because, unlike under-cabinet (task), over-cabinet (soffit), toe kick (base or floor level), or interior glass door cabinet lighting, the solid door cabinet and drawer lighting typically have independent control features. When the lights of most zones are turned on, off, or dimmed, all the lights of that group will behave the same. In contrast, when one opens a drawer and the light comes on, the similarly powered lighting of this "zone" in other drawers or in solid door cabinets need not behave the same and can remain turned off until another particular drawer or door is opened. However, for ease of description herein, these types of controlled lighting are also identified as a "lighting zone," though it may behave differently.

As described in further detail below, the disclosed integrated lighting and power solution includes one or more a multi-channel strips that either pass power along the system, create light while providing multiple zone lighting capability, or both. The disclosed integrated lighting and power solution is capable of independent control of each separate zone along the various multi-channel strips (i.e., strips). The disclosed integrated lighting and power solution includes strips that may be formed having a relatively stiff structural form, so they remain straight or linear prior to and during use. Alternatively, the disclosed strips may have a substrate with some degree of flexibility. The disclosed strips can be blank or unchipped strips (with no lights, i.e., power strips) to simply pass power along the system. Alternatively, the disclosed strips can include light emitting diodes (LEDs) or chips configured to provide illumination (i.e., LED strips or light strips). The strips can be multi-channel printed circuit board (PCB) strips, i.e., PCB light strips or PCB power strips. The light strips can include single channel (monochrome) LEDs or chips or can include multi-color chips. The light strips can thus each have a different type of light source and can be connected in series, where each segment provides a different lighting characteristic for a corresponding zone of a cabinet system. Alternatively, each light strip can have multi-color and multi-channel capability, where illumination is determined by the PCB structure of the strip and by which channel is powered. The disclosed lighting and power solution also may employ unique three-way connectors that can connect adjacent strips of the system and that can be connected to a power source. The disclosed integrated lighting and power solution solves or improves upon one or more of the above-known and/or other problems and disadvantages with prior known cabinet lighting and power systems.

Turning now to the drawings, FIG. 1 shows one example of a cabinet system or installation 20. FIG. 1 depicts an image of kitchen cabinets or cabinetry 22 with lighting employed. The cabinet system 20 depicted in FIG. 1 includes examples of countertop lighting 24 emanating from under a plurality of wall cabinets 26. The cabinet system 20 also includes interior lighting 28 emanating from within the interior of glass door cabinets 30. The cabinet system 20 further includes accessory lighting 32 emanating from beneath shorter height cabinets 34 and/or between spaced apart taller cabinets of the wall cabinets 26. The cabinet system 20 also includes soffit lighting 36 emanating from above the wall cabinets 26. The cabinet system 20 also include interior lighting 37A, 37B within the interior of closed drawers and cabinets with solid front doors or panels, respectively. This interior lighting 37A and 37B may provide illumination within the drawers and/or cabinets when opened.

The cabinet system 20 depicted in FIG. 1 is only one of innumerable different possible examples of a kitchen cabinet installation or system that is suitable for the disclosed integrated lighting and power solution. Other cabinet systems and installations, such as for bathrooms, work rooms, bedrooms, closets, and the like, as well as those specific to kitchens, may also benefit from employing the disclosed integrated lighting and power solution and system. The cabinet system and installation image of FIG. 1 is provided only to illustrate how the disclosed solution and system may be employed to improve upon or enhance the cabinetry and the installation process for such cabinetry. The cabinet system 20 in this example also shows base cabinets 38 below countertops 40, which are beneath the wall cabinets 26. Virtually any cabinet arrangement and installation, and installation method, could be enhanced using the disclosed integrated lighting and power solution. Regarding the wall cabinets 26, some may be joined together side to side at the same height. Others may be joined together side to side at different heights (known as castling), though not shown herein. Some cabinets may have different depths and some cabinets may have shorter heights, such as the shorter cabinets 34 in this example, than adjacent cabinets. Coastlining (i.e., the depth and height contours of the cabinets) variation in both the horizontal and vertical directions and arrangements is common.

As depicted in FIG. 1, the cabinet system 20 may have a plurality of different lighting zones accommodated by different power channels (defined further below). In the illustrated example, the cabinet system 20 includes four (4) different zones with lighting and power requirements. For ease of description, a first zone, Zone 1, may include the countertop or under-cabinet lighting 24 and the accessory lighting 32. A second zone, Zone 2, may include the interior cabinet lighting 28 for glass door cabinets. A third zone, Zone 3, may include the above-cabinet or soffit lighting 36. A fourth zone, Zone 4, may include the interior drawer and cabinet lighting 37A and 37B for the drawers and solid door cabinets. The Zones 1-4 in this example define four separate powered applications for cabinet lighting to be illuminated independently according to the teachings of the present disclosure. As noted below, a cabinet system may include two (2) zones, three (3) zones, or more than four (4) separately controllable lighting zones or powered applications. The integrated lighting and power system may thus provide the requisite number of power channels to accommodate the number of different zones. The phrases multi-zone and multi-channel, as used herein, are intended to refer to any of these types of systems that have at least two different illumination zones or channels, where the zones or channels are separately controllable and may or may not have different illumination requirements.

Figure 2:
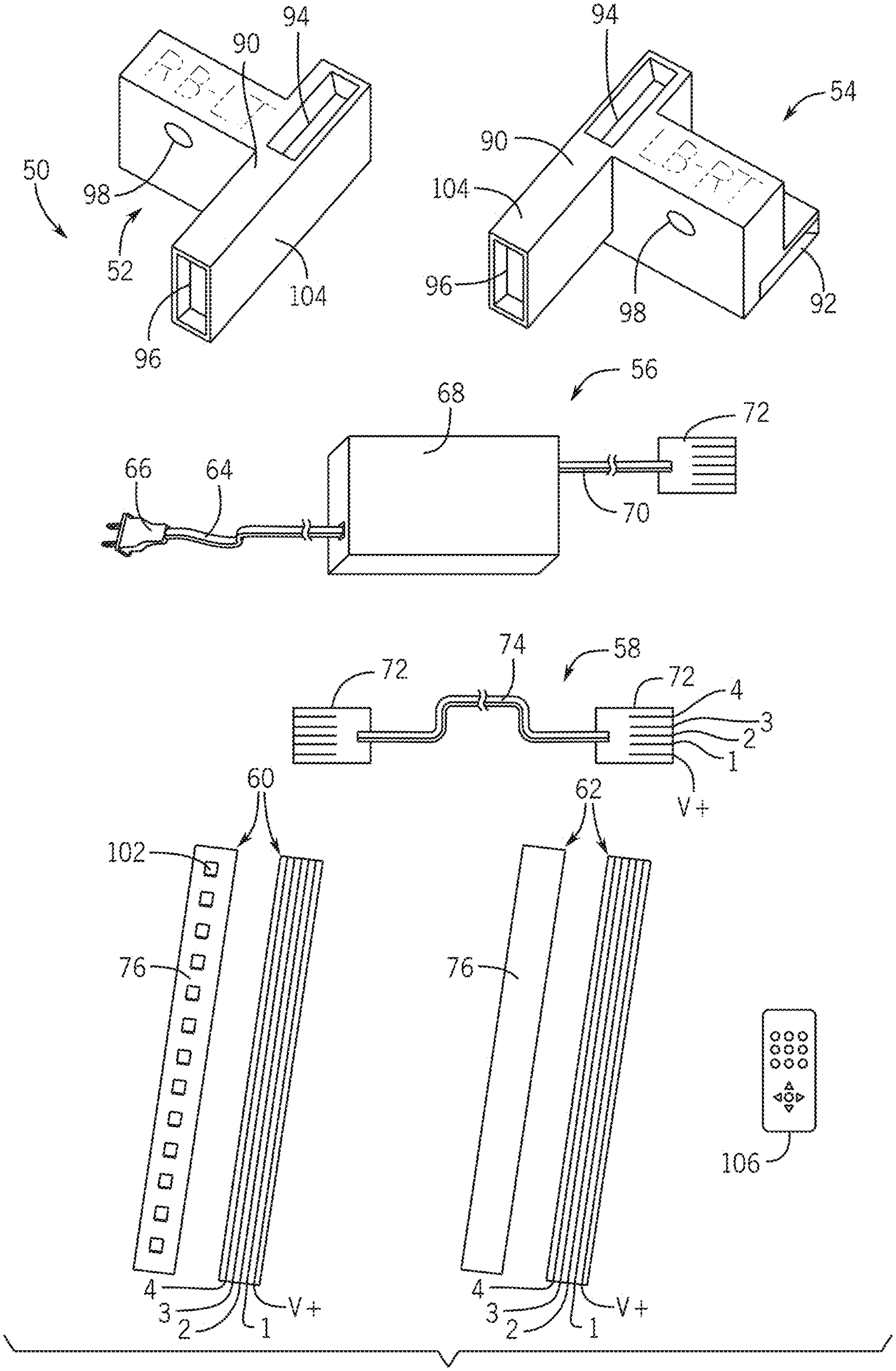
FIG. 2 shows the basic components of an integrated lighting and power system according to the teachings of the present disclosure.

Referring to FIG. 2, the disclosed integrated lighting and power solution is embodied in an integrated lighting and power system, i.e., a system 50. The system 50 may include a plurality of connectors, which may include two or more different connector types, such as corner connectors. In one example, the connectors may include one or more first connectors 52 and one or more second connectors 54. In the disclosed example, the first connectors 52 may be a mirror image of the second connectors 54. As described in further detail below, the connectors 52 and 54 can be configured and arranged to receive and/or connect power and strips in multiple different directions to achieve virtually any desired system configuration and to accommodate virtually any cabinet installation.

The system 50 may also include one or more power supplies 56, one or more cabinet links or jumpers 58, one or more light strips 60, and one or more power strips 62. Each power supply 56 may be an LED driver or controller and may include a power cable 64 with a standard household 120V alternating current (AC) plug 66 and connected to a power converter and/or driver 68 that converts AC to direct current (DC), which is suitable for powering the strips. The driver 68 may also include a processor and a memory designed and programmed to selectively control the components of the integrated lighting and power system. Each power supply or controller 56 may also include a lead 70 connected to the power converter and/or driver 68 and terminating at a male connector 72 configured to attach to the connectors 52, 54.

Each link or jumper 58 may include one of the male connectors 72 at each end. The male connectors 72 may be connected to one another by a multi-channel wire or wire set 74. Each power strip 62 may include a substrate that has an elongate body 76 that carries a plurality of lengthwise traces or tracks 78 defining the channels provided on the power strip. Each light strip 60 also includes a substrate with an elongate body 76 that carries a plurality of lengthwise traces or tracks 78 and a plurality of illumination elements. Further details of the power strips 62 and light strips 60 are described below.

The system 50 can include additional components or elements, as desired. The various details of the components of the system 50 can also vary from the examples shown and described herein. Details of the connectors 52 and 54, the jumpers 58, the power supplies 56, the power strips 62, and the light strips 60 may also vary from the examples shown and described herein.

Figure 3:
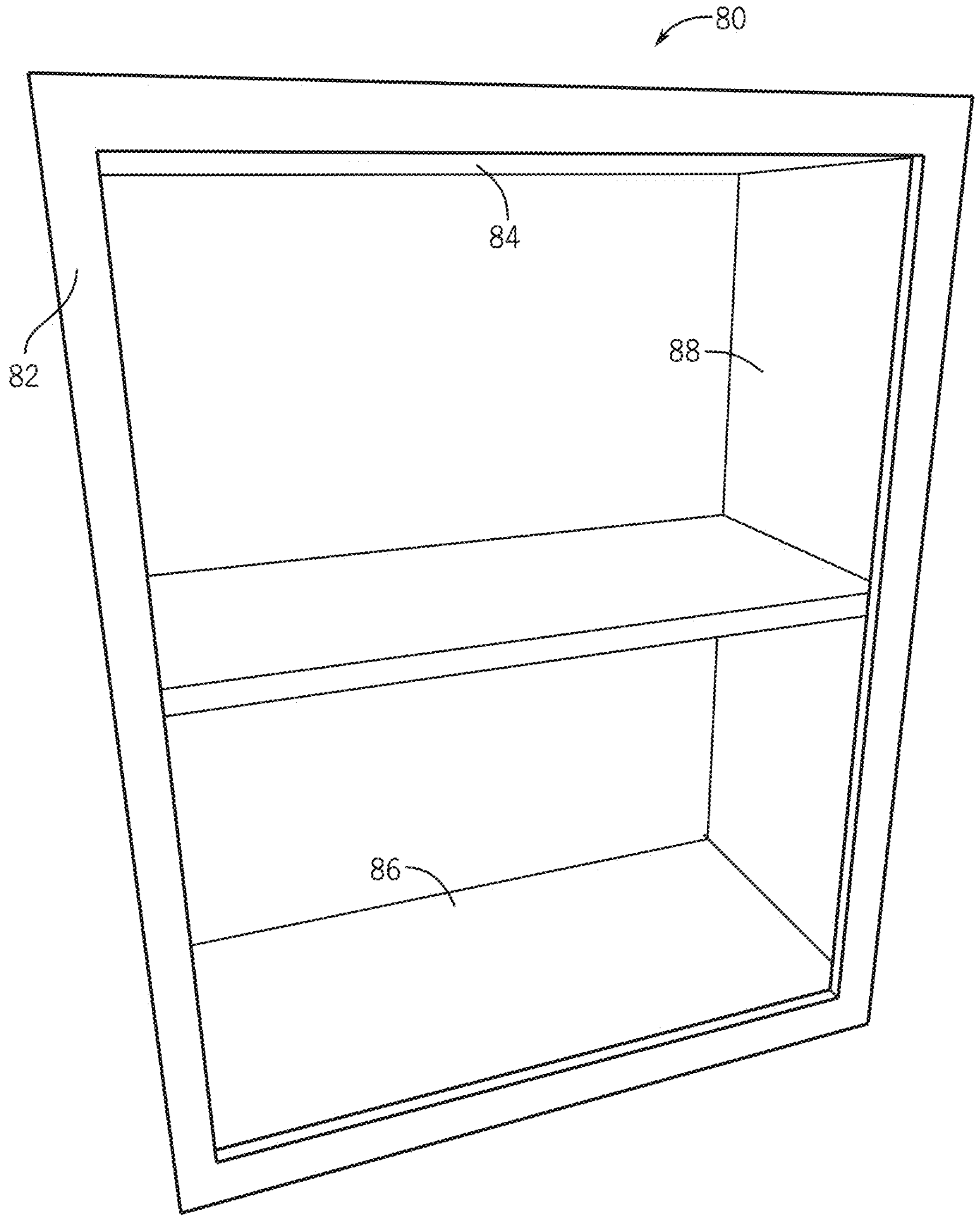
FIG. 3 shows a front view of a cabinet including (but not visible) an integrated lighting and power system according to the teachings of the present disclosure, such as that shown in FIG. 2.
Figure 4:
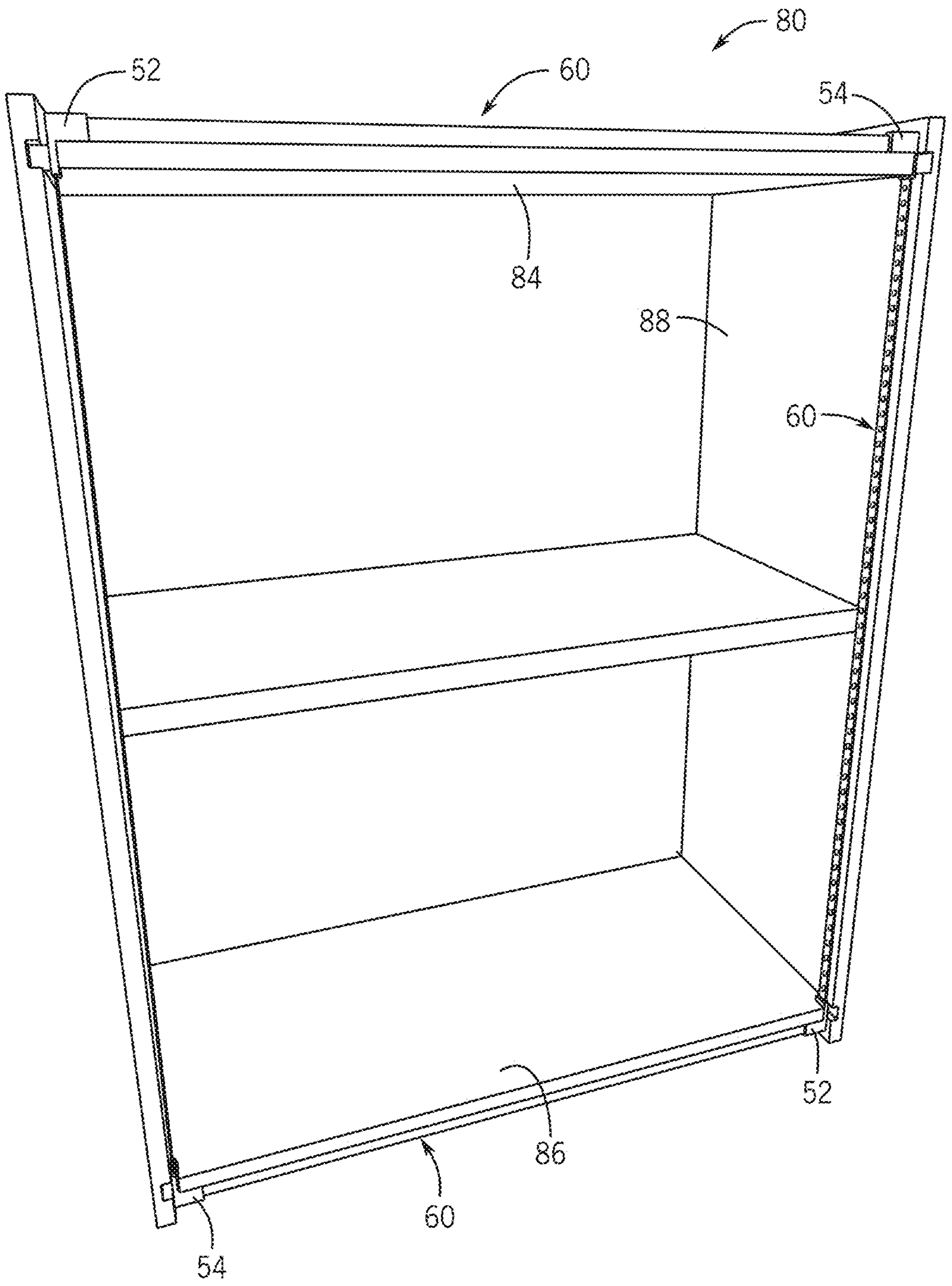
FIG. 4 shows a front view of the cabinet of FIG. 3, but with the front trim removed to expose the integrated lighting and power system.
Figure 7:
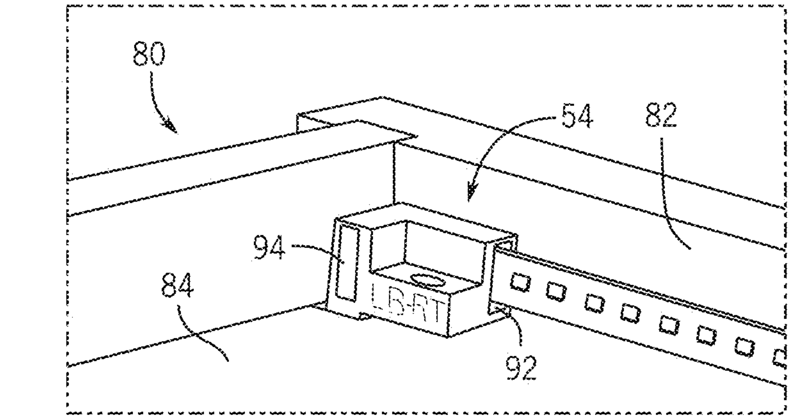
FIG. 7 shows a top right-hand side and rear view of the cabinet of FIG. 3 including a light emitting diode (LED) strip and a corner connector of the integrated lighting and power system of FIG. 2.

FIGS. 3 and 4 show a cabinet 80 with one example of an integrated lighting and power system installed on the cabinet. FIG. 3 shows a front view of the cabinet 80, whereby the components of the system are mounted behind front trim parts 82 of the cabinet and are thus not visible. FIG. 4 shows a view from the front of the cabinet 80, but with the front trim parts 82 of the cabinet removed to reveal components of the integrated lighting and power system. As depicted, the integrated lighting and power system includes a plurality of PCB light strips 60 that are mounted to the cabinet 80. In this example, the PCB light strips include a top horizontal PCB light strip 60 (viewed from the back in FIG. 4) extending across and above a top panel 84 on the outside of the cabinet 80 and behind the front trim parts 82. See also, FIGS. 7 and 8. The top PCB light strip 60 can be a part of an overhead cabinet 80 or soffit lighting zone of the system. Similarly, the PCB light strips include a bottom horizontal PCB light strip 60 extending across and under a bottom panel 86 and outside of the cabinet 80 and behind the front trim parts 82. The bottom PCB light strip 60 can be a part of an under-cabinet or task lighting zone, i.e., a different zone, of the system. The PCB light strips also include two interior PCB light strips 60 extending vertically along opposed side panels 88 on the interior of the cabinet 80 and behind the front trim parts 82. See also, FIG. 9. The vertical interior PCB light strips 60 can be a part of an interior cabinet light zone, i.e., another different zone, of the system.

The integrated lighting and power system on the cabinet 80 also incorporates a plurality of the connectors 52, 54 for connecting the various PCB light strips 60 of the system to one another and for connecting power to the system. As discussed further below, the connectors 52, 54 can be mounted to the cabinet 80 on the outside of the cabinet behind the front trim parts 82. In this example, a connector 52 is mounted on the left-hand upper corner of the cabinet 80 and a connector 54 is mounted on the right-hand upper corner of the cabinet on top of the top panel 84 of the cabinet and behind the front trim piece parts. See also, FIGS. 7 and 8. A connector 54 is also mounted on the left-hand lower corner of the cabinet 80 and a connector 52 is mounted on the right-hand lower corner of the cabinet underneath the bottom panel 86 and behind the front trim piece parts 82. Small holes or slots H can be formed through the top panel 84 near the front corners and through the bottom panel near the lower corners to permit the vertical PCB light strips 60 to extend between and be connected to the connectors 52, 54, as also described further below. See also, FIG. 9.

Figure 8:
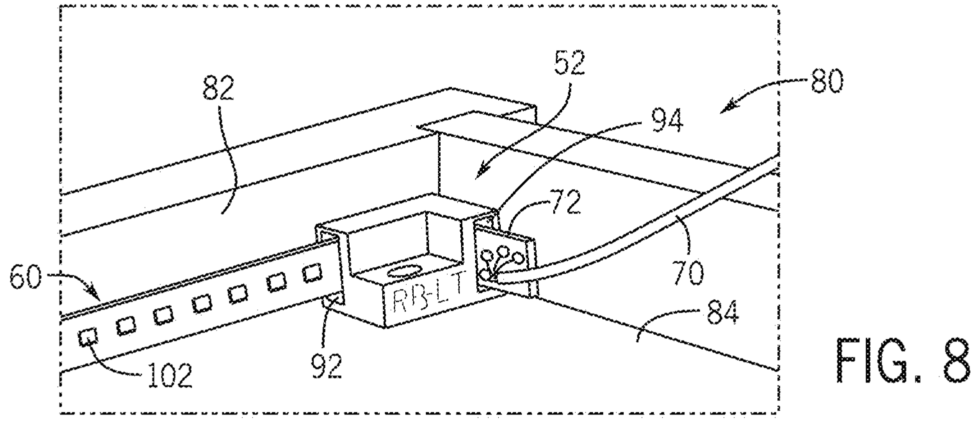
FIG. 8 shows a top left-hand side and rear view of the cabinet of FIG. 3 and an LED strip, a corner connector, and a power supply lead of the integrated lighting and power system of FIG. 2.

As shown in FIG. 8, the system on the cabinet 80 also includes a power supply, i.e., and LED driver or controller 56 (not shown in FIG. 3, 4, or 8), with a lead 70 that is directed toward one of the connectors, the connector 52 on the top left-hand side of the cabinet 80. The male connector 72 of the lead 70 is connected to the connector 52 to provide power to, and to control operation of, at least the part of the system installed on the cabinet 80. The LED driver or controller 56 can be connected to any one of the connectors 52 or 54 on the cabinet 80 to provide power to at least that part of the system, and to any one of the ports or receptacles on a given connector, in this example and as discussed further below. As also discussed below, the component arrangement of the system can be varied from this example and can be varied from cabinet to cabinet within a given integrated lighting and power system. Variations can be made, depending on the particular lighting system design and needs.

In this example, the male power connector 72 and the lead 70 may be connectable to or extend from a controller and a LED driver 56, as noted above, which can convert AC power to DC to provide power for the controller. The LED driver and controller 56 can be connected to a power source at an installation site by the cable 64 and plug 66. The LED driver and controller 56 may instead be configured to be hard wired directly to the primary AC source of power at the site but is more likely to have a connectorized attachment, i.e., the plug 66, to the power source, as well as to the controller. The power lead 70 may be configured having a multi-prong plug ($N^+$ number of channels) in the form of the male connector 72 that can be plugged into a power socket or port on a connector 52 or 54, either at the installation site or at the cabinet manufacturing site. The LED driver 56 may have or be connectable to a separate controller (not shown) or may instead have a dedicated controller provided as a part of the power supply/LED driver for AC to DC conversion.

Though not shown in the specific example of FIGS. 3 and 4, one or more of the PCB strips can be a blank power strip 62 (i.e., a power pass strip) configured simply to pass power along the system. One or more of the PCB strips can also be light strips 60 configured to illuminate the cabinet arrangement, which may include the multiple lighting zones, as noted above. Further details and options regarding the PCB strips are provided below.

Figure 5:
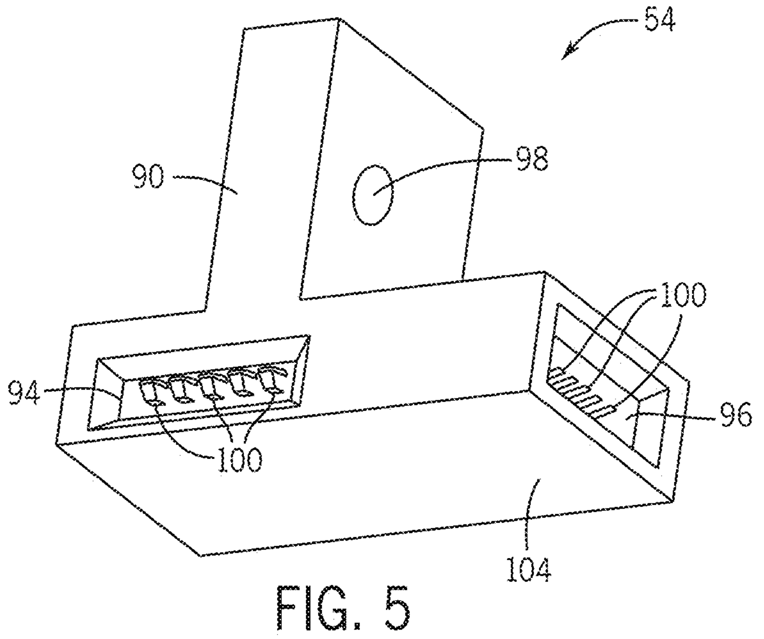
FIG. 5 shows a perspective view of one example of a corner connector for the integrated lighting and power system and constructed in accordance with the teachings of the present disclosure.
Figure 6A:
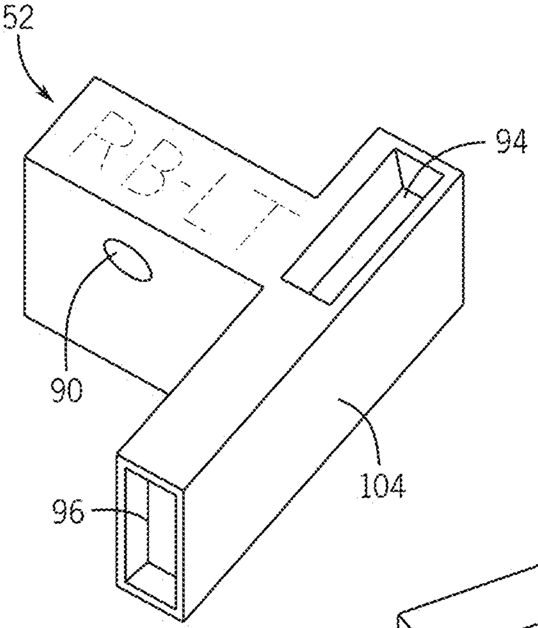
FIGS. 6A and 6B show front and rear perspective views of another example of corner connector for the integrated lighting and power system and constructed in accordance with the teachings of the present disclosure.
Figure 6B:
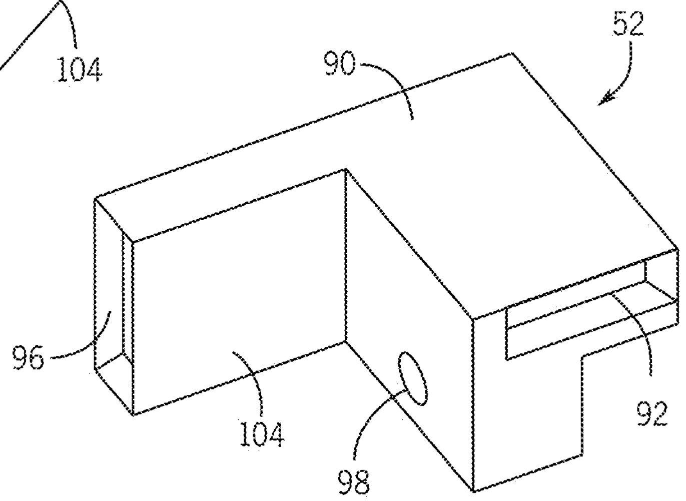

FIGS. 2, 5, 6A, and 6B show the connectors 52 and 54 of this example in greater detail. In the disclosed example, the connectors 52, 54 are provided as corner connectors in only two types. A first type, as depicted in FIGS. 2, 6A, and 6B, is a corner connector 52 configured for upper left-hand (left top or LT) and lower-right hand (right bottom or RB) installation. The first type of corner connector 52 (see the RB-LT depiction in FIGS. 2, 6A, and 8) can be mounted to the top panel 84 on the left side of a cabinet 80 or can be inverted and mounted to the bottom panel 86 on the right side of the cabinet. The second type, as depicted in FIGS. 2 and 5, is a corner connector 54 configured for lower left-hand (left-bottom or LB) and upper right-hand (right top or RT) installation. The second type of corner connector 54 (see the LB-RT depiction in FIGS. 2 and 7) can be mounted to the top panel 84 on the right side of the cabinet or can be inverted and mounted to the bottom panel 86 on the left side.

Referring to FIGS. 5, 6A, and 6B, each corner connector 52 and 54 in this example has a body 90 formed to define three receptacles, i.e., three sockets or ports, facing in three different directions. A first socket or port 92 of each connector 52, 54 faces in a direction laterally across the cabinet 80 when installed. A second socket or port 94 of each connector 52, 54 faces in a rearward direction toward the back of the cabinet 80 when installed. A third socket or port 96 of each connector 52, 54 faces in a downward direction (if on top of the cabinet top panel 84) or an upward direction (if under the cabinet bottom panel 86). The third ports 96 align with the aforementioned holes or slots H formed in the top or bottom panel when installed on the cabinet. In this example, a portion of the body 90 extends into and through the corresponding hole H exposing the third port 96 within the interior of the cabinet 80 (see FIG. 9). In this way, the bodies 90 of the connectors 52, 54 can reside on the outside of the cabinet 80. This is so the connectors 52, 54 do not interfere with any surface or space within the cabinet during use, while still allowing connection to the interior vertical PCB strips 60 or 62 along the side panels 88.

In the disclosed example, the first and third ports 92, 96 are configured to receive an end of a PCB strip, as discussed further below. The second port 94 can be configured to receive a male power connector 72 of a lead 70 that is connected to the controller, the LED driver 56, a power converter, and a power source. In the disclosed examples, the body 90 of each corner connector 52, 54 is configured to locate or orient the three ports 92, 94, 96 to face in three different orthogonal directions, such as on an x-axis, a y-axis, and a z-axis. In this way, one of the ports 96 can face toward a cabinet surface, one of the ports 92 can face in one direction parallel to a cabinet surface, and one of the ports 94 can face in a different direction and parallel to the cabinet surface. However, the ports need not each be orthogonal to one another. Fore example, at least the second port 94, i.e., the power port can be oriented in a different non-orthogonal direction relative to the other two PCB strip ports 92, 96.

The corner connectors 52, 54 in this example each also can have at least one fastener opening or hole 98 positioned to receive a screw or other such fastener (not shown). Thus, screws or fasteners can be used to secure the corner connectors 52, 54 to the cabinet. The shape and configuration of the corner connectors or three-way connectors can vary from the examples shown and described. The body can be a molded plastic material or other suitable material. Each socket or port can include appropriate contacts 100, as shown in FIG. 5, to make the necessary electrical connections with the strips 60, 62 and male connectors 72 for the integrated light and power system described herein and further below.

Referring to FIG. 2, and as mentioned above, the configuration of the plurality of strips 60, 62 can also vary. The blank or power pass strips 62 can include the body 76 made from PCB substrate material with continuous, lengthwise extending, straight or linear conductors or traces 78, such as copper traces, on the PCB substrate. The power pass strips 62 can be cut anywhere along their length to a specific desired length because the PCB power pass strip is unpopulated with LEDs and/or resisters. In one example the power pass strips 62 can include five (5) conductors or traces 78, with one conductor for providing a voltage (V+) and the other four (4) conductors provided to pass signal for up to four zones. The number of conductors, and thus the number of zones can vary and does not need to be limited to four (4) zones. The traces or conductors 78 can be provided on either side of the PCB power pass strips 62. Likewise, the corresponding positioning of the contacts 100 in the ports 92, 94, 96 of the connectors 52, 54 can be provided to accommodate insertion of the power strips 62 with the traces 78 facing in a desired direction. With the contacts 100 facing as shown in FIG. 5, the traces or conductors 78 would be exposed or visible when installed. In another example, the contacts within the connectors may be oriented such that the traces or conductors 78 are positioned to face a surface of the cabinet so as not to be exposed when installed.

The plurality of strips 60, 62 can also include one or more different types of light strips 60, depending on the needs of a particular system design. In one example, the light strips 60 can include the body 76, also made from relatively rigid PCB substrate material. The light strips 60 also include a plurality of electrical components or light emitters, i.e., LEDs or diodes 102, which are spaced apart along the length of the PCB substrate. The PCB substrate material can further include continuous, lengthwise extending, straight or linear conductors or traces 78, such as copper traces, on the PCB substrate. The light strips 60 can include the same number of conductors or traces 78 as the power pass strips 62, which in this example is five (5) conductors or traces. Again, one conductor or trace 78 may be for providing a voltage (V+) and the other four (4) conductors or traces may be for passing a signal for up to four zones along the strip. One of the conductors or traces 78, i.e., one channel of the light strip 60, may be connected to the LEDs or diodes 102 along the strip. The LEDs 102 on the light strip 60 are illuminated when that channel or trace 78 is active, i.e., when power is passed or turned on along that specific channel.

In the disclosed example, the PCB strips 60, 62 have four channels or zone traces 78, i.e., N1 to N4, and one voltage trace V+. In other examples, fewer or more such traces can be provided. For example, PCB strips and corner connectors could be designed to accommodate 5 or 6 zones, if desired. The number of conductors or traces 78, and thus the number of zones defined by the light strips 60 can also vary and does not need to be limited to the four (4) zones of this example.

The traces or conductors 78 can also be provided on either side of the PCB light strips 60 and thus can be on the same side as the LEDS 102 or on the opposite side of the PCB substrate of the light strips. Likewise, the corresponding positioning of the contacts 100 in the ports 92, 94, 96 of the connectors 52, 54 can be provided to accommodate insertion of the light strips 60 with the traces 78 facing in a desired direction. With the contacts 100 facing as shown in FIG. 5, the traces or conductors 78 would be exposed or visible when installed and would be on the same side as the LEDs 102 on the PCB substrates. In another example, the contacts within the connectors may be oriented such that the traces or conductors 78 are positioned to face a surface of the cabinet so as not to be exposed when installed.

In one example, the four (4) conductors or traces 78 can be for controlling multiple different types of light strips 60, such as four (4) types of light strip used within an integrated lighting and power system. One type of light strip 60 may be used for each of the four lighting or illumination zones of the cabinet installation 20 described above. For example, under-cabinet PCB strips 60 (see the bottom horizontal strip exposed in FIG. 4) may carry LEDs that are connected to the V+ conductor or trace 78 and a first one of the four additional conductors or traces designated for Zone 1 in FIG. 1. The PCB light strips 60 for Zone 1 will pass V+ along the V+ conductor, as well as all four zones all the way from one corner connector 52, 54 to the other, but will only tap the V+ and the Zone 1 conductors or traces 78 to illuminate the LEDs 102 of Zone 1.

The vertical PCB light strips 60 (see FIGS. 4 and 9) on the inside of a glass door cabinet 80 or opaque door cabinet will also pass power plus all four zones along the five (5) traces 78. However, the LEDs 102 on these types of PCB light strip 60 will be connected or tapped to the V+ conductor and only the conductors or traces 78 for Zone 2 in FIG. 1. Further, the over cabinet PCB light strips 60 (see FIGS. 4, 7, and 8) may be a third type of light strip and will have LEDs 102 on the PCB light strips connected or tapped to the V+ conductor or trace 78 and only to the Zone 3 traces. In one alternative, a fourth type of PCB light strips 60 can similarly have LEDs 102 connected or tapped to the V+ conductor 78 and only to the Zone 4 conductors or traces on the strips. The fourth type of PCB light strips (not shown) can be used inside the cabinet arrangement of FIG. 1 within Zone 4 to illuminate solid door cabinets and drawers.

In another alternative, the fourth type of PCB strips could be configured to be tapped to power external devices or to support additional design options. For example, a system can have Zone 2 PCB light strips 60 to illuminate glass door cabinets where it is desirable for the lights to be illuminated even when the glass doors are closed. A system can have Zone 4 PCB light strips 60 within solid wood cabinet doors, where it may be desirable to always want the lights to turn on when the door is opened and to turn off when the door is closed. Thus, these PCB light strips would need a separate channel or traces 78 for Zone 4 in FIG. 1 These different types of PCB light strips thus prevent a dimmed or off position in Zone 2 from keeping the solid door cabinet utility lights from functioning properly.

In each example, each of the ports 92 and 96, and optionally also the power ports 94, on the connectors 52, 54 can have a substantial depth. The contacts can be designed to provide electrical contact at or near the entry opening into the ports. The depth of the ports may be a minimum of one-half of the spacing interval between the electrical components 102 on the PCB light strips 60. The depth may be a maximum of the spacing interval between the components 102 on the light strips 60. For example, each PCB light strip 60, regardless of which zone type, can have a one inch cut interval and can have one LED or diode per inch along the length of the bulk PCB light strips. Similar to the power pass PCB strips 62, the PCB light strips 60 can also be provided in long uncut lengths to be cut to length to meet the needs of a particular system design. In this example, the depth of the ports of the connectors can thus be a minimum of a one-half inch depth and a maximum of a one inch depth. The depth of the ports can thus allow the rigid strips 60, 62 to be roughly cut to length, be inserted into the ports, and still make electrical contact within the ports.

In the disclosed example, the rigid PCB strips 60, 62 may be made from aluminum, fiber board, or the like. The PCB strips may include long copper traces 78 that extend the length of the strips. On each lighting strip 60, one of the traces 78 also connects the diodes or LEDS 102 along on the length of the substrate. The diodes or LEDs 102 may be spaced at one LED per inch along the strip, as noted above, although other spacing intervals may also be utilized. The long, exposed traces 78 allow the PCB strips 60, 62 to be inserted into the selected first port 92 or third port 96 of a corner connector 52 or 54 to varying degrees. Thus, the PCB strips 60, 60 do not have to be precisely cut in order to make a proper electrical connection. Further, manufacturing tolerance in cabinetry can be up to $1/16^{th}$ of an inch or more. The PCB strip and corner connector port design can also accommodate this type of relatively large tolerance, as electrical connections can be made to varying degrees between each PCB strip end and the corresponding port. Since the corner connectors have the electrical contacts at the mouth of the connector opening (see FIG. 5), a PCB strip gets its power whether it is inserted a lot or just a little into a port. In the disclosed example, with a half inch of play at both ends of the PCB strip, one can match virtually any tolerance or cabinet dimension.

As noted above, in one example, the intent of the disclosed integrated lighting and power system is to allow for different PCB strips offering different lighting characteristics on a single, seamless infrastructure. In one example, the PCB lighting strips 60 can include strips that use only monochrome LED chips 102. In other examples, more expensive, more complex, multi-zone chips could be utilized and/or multi-colored LEDs could also be utilized. However, the controller and system would become much more complex. In the disclosed example, the PCB light strips allow the controller to manage each zone without the chip needing to support multiple zones. In addition, for most installations, only one zone, i.e., channel or trace 78, will be utilized for each active PCB strip.

The different monochrome PCB strips can then be offered having brighter chips, dimmer chips, chips of different Kelvin, and the like. For example, undercabinet lights are typically brighter to provide good task lighting. Over cabinet lights are generally not as bright, i.e., are softer, for more accent/mood lighting. Some users may prefer cooler lighting for the interior of wood door cabinets, as it provides better visual acuity at the same lumen level. In other examples, some PCB strips may have front facing LEDs and other PCB strips may have side emitting diodes. More complex PCB strips can even allow control of two zones on the same strip. For example, undercabinet PCB strips may have one zone of side emitting diodes, which may face the backsplash. The other zone on the same PCB strip may have down facing diodes to brightly illuminate the countertop. Thus, on such a light strip, some of the chips or LEDS 102 would be connected to the V+ trace and one of the zone traces, and the other chips or LEDs would be connected to the V+ trace and a different one of the zone traces to be controlled independently. The variety of the PCB strips can vary within the spirit and scope of the disclosure.

Figure 9:
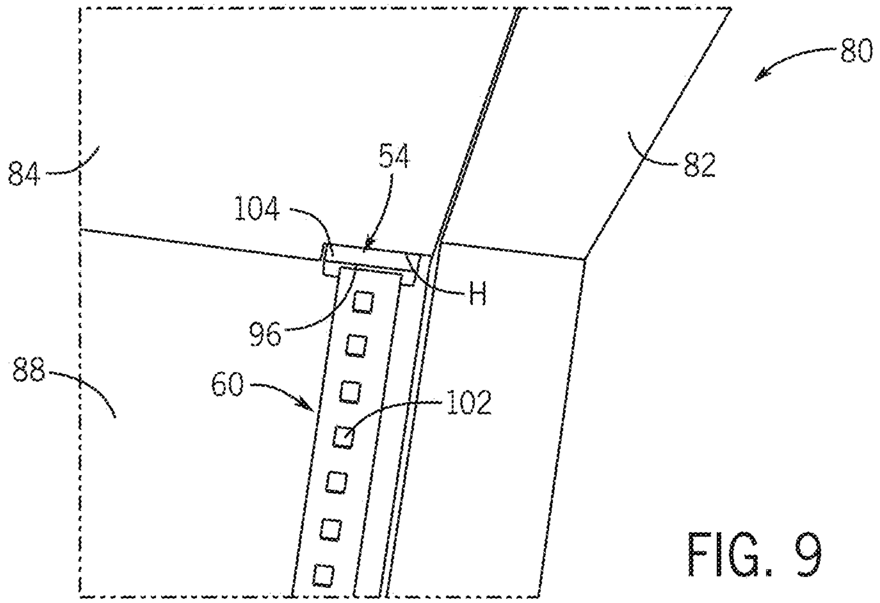
FIG. 9 shows an interior view of the top right-hand side of the cabinet of FIG. 3 including an LED strip and a portion of the connector of FIG. 7 extending through a hole into the cabinet interior.

Referring to FIGS. 5, 6A, 6B, and 7-9, the bodies 90 of the connectors 52, 54 in this example have orthogonal flat surfaces and sharp corners and edges. This allows the ports to easily be positioned to face in different orthogonal directions on faces of the connectors. This also allows the connectors 52, 54 to be "corner" connectors, as they fit snuggly into right angle corners of the cabinets. See FIGS. 7 and 8, for example. This also allows the ports 92, 94 to be closely adjacent a surface of the cabinet and the strips 60, 62 to extend closely parallel to a cabinet surface. One leg 104 of the connector 52, 54 can extend orthogonally through a hole H in the cabinet panel so that the port 96 is accessible within an interior of the cabinet, as depicted in FIG. 9, without the connector bodies 90 interfering with the cabinet space.

Figure 10:
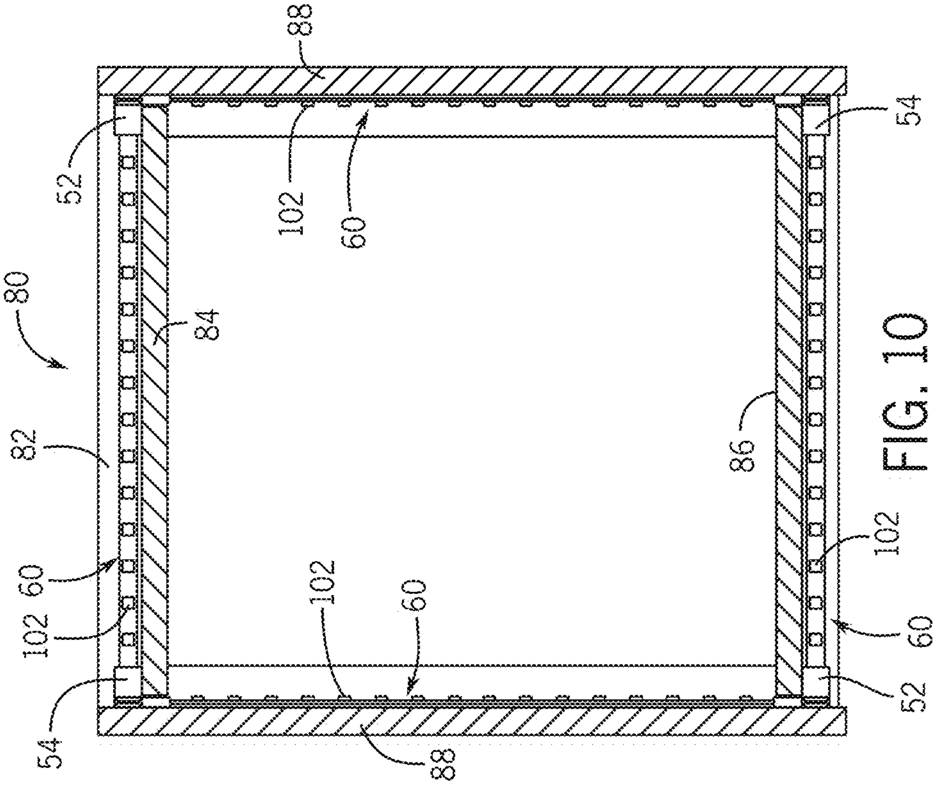

In the disclosed example, the integrated lighting and power system can be configured in a number of different ways to accommodate various designs. The cabinet 80 of FIGS. 3, 4, and 7-9 is represented in the arrangement of FIG. 10. In this arrangement, power can be connected to one of the corner connectors 52 (see FIG. 8). The arrangement includes an over cabinet PCB light strip 60 that illuminates an area above the cabinet 80. The arrangement also includes an undercabinet light strip 60 that illuminates an area beneath the cabinet 80. The arrangement also includes two vertical interior PCB light strips 60 that illuminate the cabinet interior. The strips are joined to one another through the various corner connectors 52, 54.

Figure 11:
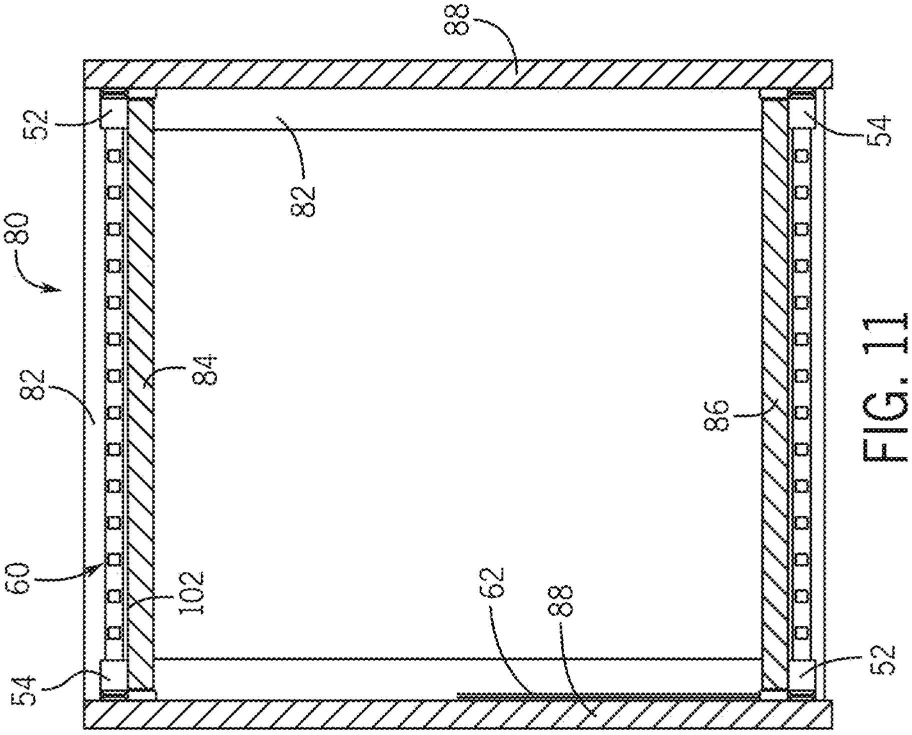
FIGS. 10-14 show various different configurations of an integrated lighting and power system installed on cabinets in accordance with the teachings of the present disclosure.
Figure 13:
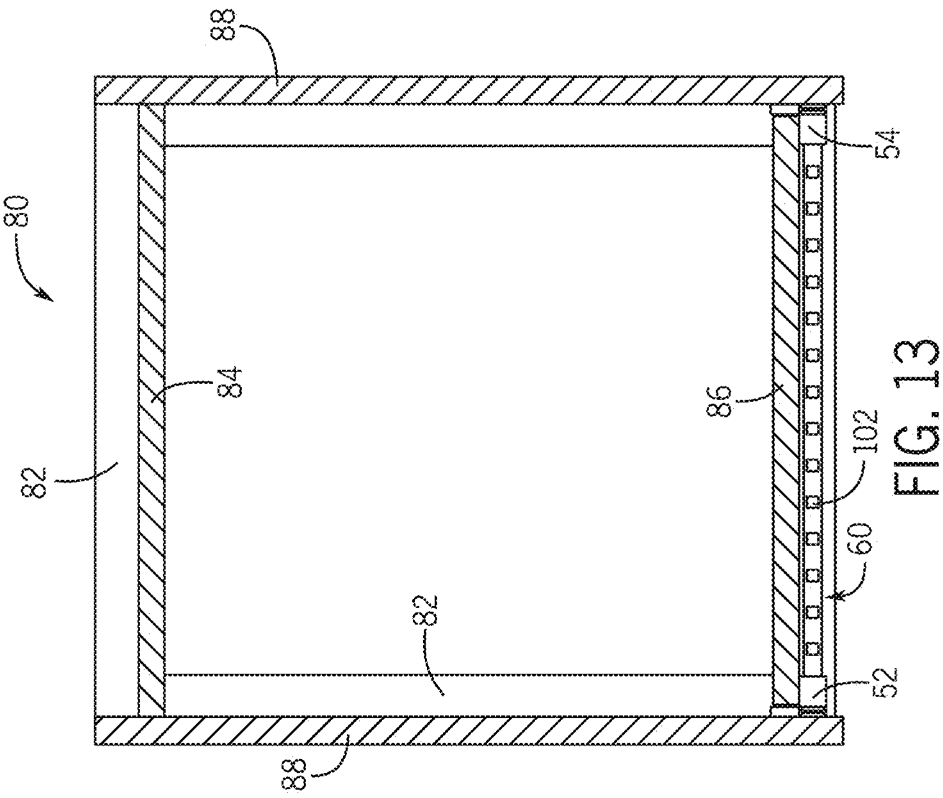
Figure 12:
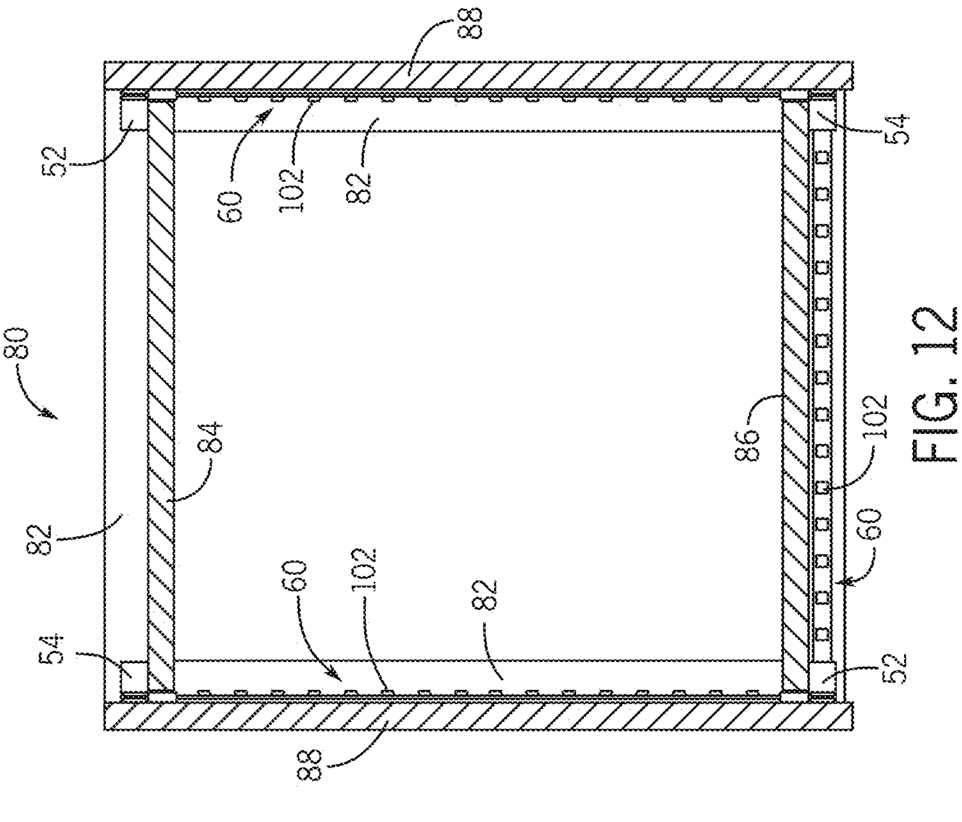

The arrangement of FIG. 11 is different. In this arrangement, the solution includes only over cabinet lighting and under cabinet lighting. A blank PCB strip or power pass strip 62 extends vertically along one side of the cabinet interior to pass power for the two horizontal PCB lighting strips 60 via the corner connectors 52, 54. The arrangement of FIG. 12 is similar to FIG. 10 but does not have an over cabinet lighting strip. The arrangement of FIG. 13 has only an undercabinet lighting strip 60. In this arrangement, a power pass PCB strip 62 (not shown) may be employed to deliver power from a top corner connector to a bottom corner connector, if desired. Alternatively, power may be delivered directly to one of the lower corner connectors 52 or 54.

In the disclosed example, the controller of the LED driver or power supply 56 can be configured to provide intelligence to the system via a programmed or programmable processor. The controller can be configured to control which of the zones are to receive power at any given time so that the lighting zones can be controlled independently. A power lead 70 can be coupled to the controller and terminate at the male power connector 72, which can be plugged into any one of the power ports 94 on any of the connectors 52, 54 of the system. In one example, a separate power lead 70 can be connected to one of the corner connectors 52, 54 on each separate cabinet of an installation. These power leads 70 can be connected to a single LED driver and power supply 56. A single controller may be connected to the LED driver or power supply 56 to controller the entire system. Multiple LED drivers or power supplies 56 may be utilized in a single installation, if desired. A single controller may be connected to the multiple drivers or each may include a dedicated controller, with each controller being tied together to be controlled as one or simultaneously.

Figure 14:
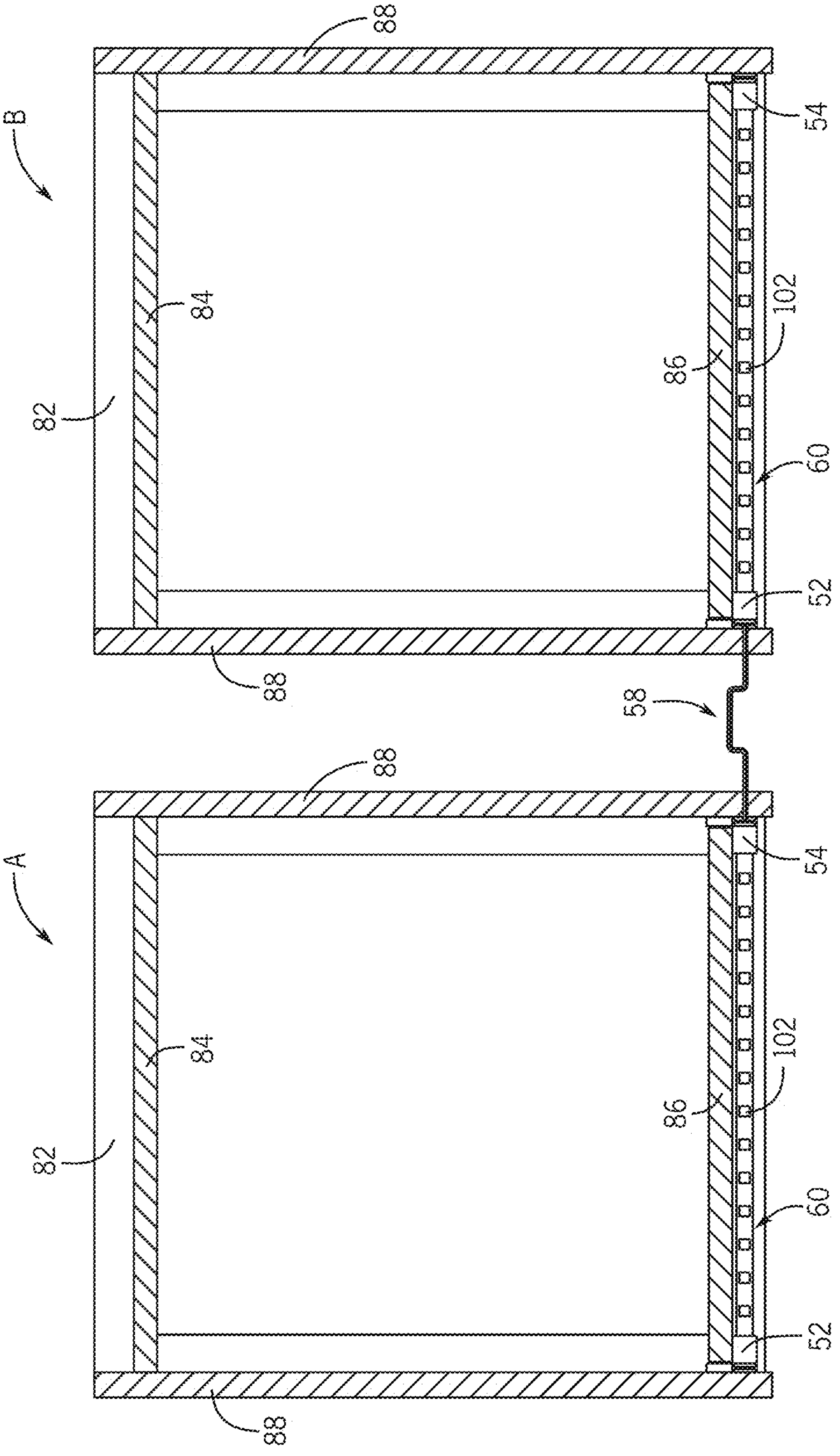

However, in another example as depicted in FIG. 14, multiple cabinets A, B can be linked to one another and one power lead can provide power to multiple adjacent and linked cabinets. A link or jumper 58 can be utilized to connect a connector 52 on one cabinet to a connector 54 on another cabinet to link and connect the traces 78 of the adjacent cabinets. One power lead and power connection for each cabinet can provide simplicity of troubleshooting and design. Also, when multiple cabinets are linked via jumpers 58, there may be an undesirable voltage drop across the system. Further, troubleshooting may be more difficult when there is a problem in the system. System complexity can also be increased. However, in some instances, a link or jumper cable 58 may be necessary or desirable between the power ports 94 of two corner connectors 52, 54 on different cabinets. In such an arrangement, a first cabinet A can have a power lead 70 connected to the controller and a second cabinet B can be linked in by the jumper 58 to get power and zone signals from cabinet A. The disclosed integrated lighting and power system can further accommodate both a linked cabinet configuration and a "hub and spoke" configuration where each cabinet has a single wire that runs back to the controller. In a linked configuration, the cable has a power connector on both ends that plugs into any power port on the adjacent cabinets, as noted above.

Other cabinet, lighting, and power arrangements are also possible since the disclosed system is highly versatile. Also, one or more PCB light strips 60 can carry an illumination source or light element that is different from the other segments, as noted above. One or more of the PCB light strips 60 may have LEDs 102 that are low power and produce a warm Kelvin illumination. For example, the soffit accent lighting 36 of Zone 3 in FIG. 1 does not need to be very bright while still providing a pleasant effect. The throw distance of such lighting may be limited but may be satisfactory to provide the desired accent lighting effect. Thus, warm Kelvin illumination may be utilized for the PCB light strips 60 over the cabinets of Zone 3 in the example of FIG. 1.

One or more of the PCB light strips 60 may have LEDs 102 that are slightly higher power and produce a cool white illumination. For example, the interior application of the solid door cabinets and drawers, i.e., Zone 4 in FIG. 1, of the base cabinets 38 may require moderate illumination 37A, 37B and may be illuminated when a door or a drawer is opened. The intent is to provide utility light just when the door or drawer is open. In this instance, visual acuity may be more important than trying to match the other lighting in the room. Thus, a simple cool white LED 102 or illumination source may be used for the PCB light strips 60 of Zone 4 in the example of FIG. 1.

One or more of the PCB light strips 60 may have LEDs 102 that are still higher power and higher wattage. For example, the undercabinet lighting 24 of Zone 1 in FIG. 1 may generally be more oriented toward task lighting. Thus, one or more of the PCB light strips 60 could include higher wattage LEDs 102 or illumination elements. One may want the task lighting 24 to match the other lighting in the room. Thus, the LEDs 102 or illumination elements of the Zone 1 light strips may be provided and configured to produce warm white light.

One or more of the PCB light strips 60 may have LEDs 102 that are low or medium wattage but also produce a warm white light. For example, the interior cabinet lighting 28 of Zone 2 in FIG. 1 for the cabinets 30 with glass doors may be more for accent lighting. However, because the lighting is visible from within the room, even with the doors closed, one may prefer that the light more closely match the other room lighting. Thus, the LEDs 102 or illumination elements of the Zone 2 lighting strips 60 may be low or medium wattage at warm white.

In another example, as noted above, one of the channels or traces 78 may be used to provide independent controllable power to operate other products or components instead of zoned lighting or lighting applications having another LED strip. For example, one channel of the PCB strips may be connected to a fan (not shown) that is mounted somewhere in the storage space. The fan may be controlled by operating the prescribed channel. A remote 106 (see FIG. 2) may be provided that can operate the controller and/or LED driver 56 to control each of the multiple channels of the PCB light strips 60 separately. The remote 106 can be used to turn all of the lights of a zone ON or OFF and to dim a zone. If another powered device, product, component, or accessory, such as a fan, is connected to one of the channels, the fan can be controlled using the remote. When the channel is turned ON, the fan will operate. When the channel is turned OFF, the fan will be turned off. When the dimming function of the channel is used, the fan speed may be controlled or controllable.

Other channels may be utilized in a similar fashion to control other powered devices, products, components, or accessories, such as speakers, timers, Bluetooth devices, chargers, or the like. Also, one or more channels of the powered light strip may go unused in any given installation, if desired. The solution can be used and varied to accommodate a wide variety of lighting systems and arrangements and cabinet systems and installations.

The PCB light strips, power pass strips, and corner connectors can be installed on hidden surfaces of the cabinet system or installation. If desired, the cabinetry can be created having face frame surfaces, with or without recessed grooves, channels, or dados, along hidden surfaces of the cabinet components. However, it is very common to install light strips on flat surfaces of the cabinets. The PCB light strips can be routed and seated on these surfaces or in these grooves when installed. The PCB light strips and corner connectors can be pre-installed at the factory for the cabinets or can be installed at the installation site, if desired. The PCB light strips can be easily measured and cut to length to be attached to the cabinets at the factory or at the installation site.

In the completed cabinet system or installation, the face frame surfaces or the grooves, and thus the PCB light strips, can be positioned to illuminate the desired space, region, or area of the cabinetry. For example, some of the face frame surfaces or the grooves, and portions of the PCB light strips, can be outside of and exposed to the exterior of the cabinetry to illuminate spaces above or below various parts of the cabinet system or installation. Some of the face frame surfaces or the grooves, and thus portions of the PCB light strips, can be within and exposed to interior spaces of the cabinetry to illuminate such interior spaces of the cabinet system or installation.

The disclosed integrated lighting and power solution provides a simple, minimalistic lighting system. The disclosed system is easy to install, easy to manufacture, and easy to use. The disclosed system can be operated with a single remote configured to control multiple channels of a PCB. The disclosed system may include only a single power lead or multiple power leads. The system may require only a single connection to a power source or may utilize multiple connections to the power source. The system may also utilize only one controller with multiple connections to that controller or may utilize multiple controllers that may be controlled as one or separately. The disclosed system provides a lighting solution that offers tremendous design flexibility and functionality while utilizing only a very minimal number of very basic components.

The disclosed lighting and power system also has one or more a multi-channel strips that either pass power along the system, create light while providing multiple zone lighting capability, or both. The disclosed integrated lighting and power solution is capable of independent control of each separate zone along the various multi-channel strips (i.e., strips). The disclosed integrated lighting and power solution includes strips that may be formed having a relatively stiff structural form, so they remain straight or linear prior to and during use. Alternatively, the disclosed strips may have a substrate with some degree of flexibility. The disclosed strips can be blank or unchipped strips (with no lights), i.e., power strips, to simply pass power along the system or can include LEDs or chips configured to provide illumination. The light strips can be multi-channel PCB strips with single channel (monochrome) chips or multi-color chips. The light strip segments can thus each have a different type of light source and can be connected in series, where each segment provides a different lighting characteristic for a corresponding zone of a cabinet system. Alternatively, each light strip can have multi-color and multi-channel capability, where illumination is determined by the PCB structure of the strip and which channel is powered. The disclosed lighting and power solution also is configured to employ unique three-way connectors that can connect adjacent strips of the system and that can be connected to a power source. The disclosed integrated lighting and power solution solves or improves upon one or more of the above-known and/or other problems and disadvantages with prior known cabinet lighting and power systems.

One existing lighting solution that offers independent zone control requires the use of digital LED strips, which are very expensive. Digital LED strips carry individually addressable diodes and thus multiple associated controllers. For each cabinet size, arrangement, etc., one would need to count how many diodes are on each digital LED strip length and program those specific chips to respond to commands as a group. Such a digital solution is also limited to using multiple, specific power level strips. In one example, kitchens have many cabinet size options and arrangements in one cabinet system or installation. The digital approach would be very expensive and not practical.

During fabrication of the cabinets or a cabinet system, or during installation at the installation site, it is only necessary to drill fastener holes (if needed) and the narrow slots or holes H for extending the PCB light strips 60 or power pass strips 62 from the inside of a cabinet to the corner connector ports 96. The cabinetry does not otherwise need to be altered to accommodate the disclosed integrated light and power system.

If desired, fewer than all of the cabinets for a given cabinet system or installation may be provided with a lighting feature. Those cabinets without lighting may be installed with no PCB strips or corner connectors or may be provided with one or two corner connectors and one power pass strip to jump power between cabinets and to otherwise bypass the unlit cabinets.

As noted above, the one or more power converters or LED drivers of the system may be plugged into a wall outlet or socket at the installation site. Alternatively, the power converters or LED drivers could instead be hard wired directly to the power source of the installation site, such as a traditional 120V AC system. The controller and/or the LED driver or converter may include a multi-prong plug that plugs into the power source. In any case, the connection to the power source may be a switched connection.

In general, one example of a method of installing the disclosed integrated light and power solution or system includes installing the power lead, a controller, and a driver on one or more of the cabinets of the system at the factory, along with the PCB strips and the corner connectors. Alternatively, some or all of the PCB strips and/or some or all of the corner connectors can be installed on each of the cabinets of the system or at least on the cabinets selected for illumination at the installation site or the factory, while the lead, driver, and controller are installed at the installation site. If desired, one or more powered devices, products, components, or accessories, such as the aforementioned fan, may be powered by the integrated light and power solution. Such components or accessories may also be installed on the cabinets at the factory or at the installation site. If the integrated lighting and power solution is pre-installed at the factory, the cabinets can then be shipped or delivered to a site for installation at the site. Any connections to power or among linked cabinets can then be made at the site, as needed. Alternatively, all or part of the integrated light and power solution can be installed on the cabinets at the installation site.

Some components or accessories may be more suitable for being installed and/or connected at the installation site. For example, a phone charger or charging system, a Bluetooth device, a Bluetooth speaker system, a tablet screen or display, or the like may be easily connected to a PCB strip of the integrated light and power solution or system after the cabinets are installed. Other such components or accessories may be easier to mount or install at the factory, such as a fan or the like.

In the disclosed examples, the channels are defined by the conductors or traces 78 on the strips 60, 62. One of the traces is a voltage trace V+. The remaining traces can define the number of channels of the system. If there are only two traces, the system would be a single channel system. With three traces, the system would be a two channel system. With four traces, the system would be a three channel system. With five traces, as in the illustrated examples, the system would have four channels, and so on.

In one example, each of the ports on the connectors, or at least the ports configured to receive the light strips, can include a slot along one of two opposed surfaces within the port. The slots can be provided for clearance to allow insertion or partial insertion of a light strip whereby a chip or LED slides along the slot into the port. This would permit even greater variance in how roughly or inaccurately the strips would need to be cut when installing a system.

The disclosed integrated lighting and power solution and system offers a modular, easy to install solution. The system can be relatively inexpensive regarding part cost, manufacturing cost, and installation and repair expense. The system allows easy field updates, repairs, and the like, when upgrades or repairs are desired for a cabinet installation. Each connector or corner piece features a power lead port, which allows for linking of cabinets or home runs back to the controller via a power lead.

Further, the strips may have more than one set of illumination elements, which can be controlled via a single channel or which can be controlled via multiple channels independently. This will impact the aforementioned description regarding having one channel per light strip. As discussed briefly above as well, each light strip may instead have two or more different channels. In other words, a light strip in question may have some illumination elements connected to a first channel or trace and other illumination elements connected to a second channel or trace. The strip design can thus be set up where such a light strip could be controlled by two channels on the controller. A second strip with a single set of illumination elements could then use a third channel on the controller, and the like.

Although certain modular lighting and power systems, lighting systems, power delivery and control components, connectors, system components and accessories, and installation methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A connector for an integrated lighting and power system for cabinets, the connector comprising:

a body;

a first port having a depth into the body, N number of electrical contacts therein, and an opening at a surface of the body;

a second port having a depth into the body, N number of electrical contacts therein, and an opening at a surface of the body; and a third port having a depth into the body, N number of electrical contacts therein, and an opening at a surface of the body, wherein each port of the first, second, and third ports is oriented facing a different direction relative to the other of the first, second, and third ports, and wherein the opening of each port of the first, second, and third ports is an elongate slot configured to receive therein an end of a light strip formed of an elongate substantially rigid printed circuit board material.

2. The connector of claim 1, wherein the N number of electrical contacts is disposed at or very near the opening for each of the first, second, and third ports.

3. The connector of claim 1, wherein each port of the first, second, and third ports is oriented relative to a different axis of the body and about 90 degrees relative to the other of the first, second, and third ports.

4. The connector of claim 1, further comprising a second connector, the second connector being a substantial mirror image of the connector.

5. The connector of claim 1, wherein each port of the first, second, and third ports has a depth into the body in a range of 0.5 in. to 1.0 in. configured to allow for insertion of a light strip to a variable depth while still in electrical contact with the N number of contacts therein.

* * * * *